(Model.)

2 Sheets—Sheet 1.

J. H. BARLEY.
HARROW.

No. 253,340.

Patented Feb. 7, 1882.

Witnesses.
W. W. Mortimer
A. C. Kiskadden

Inventor
Jas. H. Barley,
per
F. A. Lehmann,
Atty.

(Model.)
2 Sheets—Sheet 2.
J. H. BARLEY.
HARROW.
No. 253,340.
Patented Feb. 7, 1882.
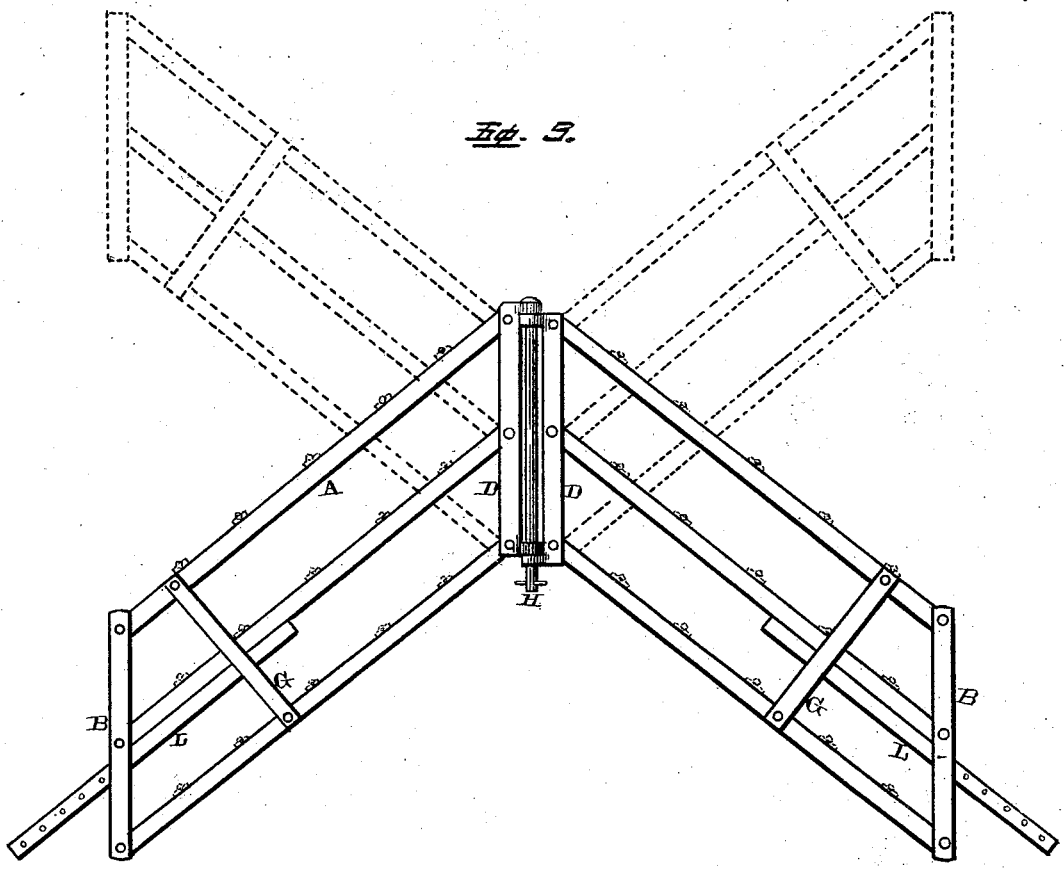
Witnesses.
W. W. Mortimer
A. C. Kiskadden
Inventor.
Jas. H. Barley,
per
F. A. Lehmann,
Att'y

UNITED STATES PATENT OFFICE.

JAMES H. BARLEY, OF SEDALIA, MISSOURI.

HARROW.

SPECIFICATION forming part of Letters Patent No. 253,340, dated Febuary 7, 1882.

Application filed July 28, 1881. (Model.)

*To all whom it may concern:*

Be it known that I, JAMES H. BARLEY, of Sedalia, in the county of Pettis and State of Missouri, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and it consists, first, in the combination of three gangs of V-shaped frames composed of six sections, which sections are joined together in pairs and connected at their front ends by chains to equalizing-bars which form the draft attachment. The object of this part of my invention is to dispense with the usual couplings which have been used for holding the different parts the desired distance apart and in the line of draft, and to enable each wing to be raised and lowered vertically to free the teeth from trash and other obstructions. Second, in combining with the sections of the harrow, each one of which is provided with the usual rigid teeth, a series of spring-wire teeth for the purpose of running along directly over the growing plants, and which spring-teeth are made removable when not needed. The object of this part of my invention is to have the rigid teeth harrow in between the rows of corn, and to have the spring-teeth run directly along the rows of corn, and thus pulverize the earth all around the young growing plants without danger of uprooting or damaging them.

Figure 1:
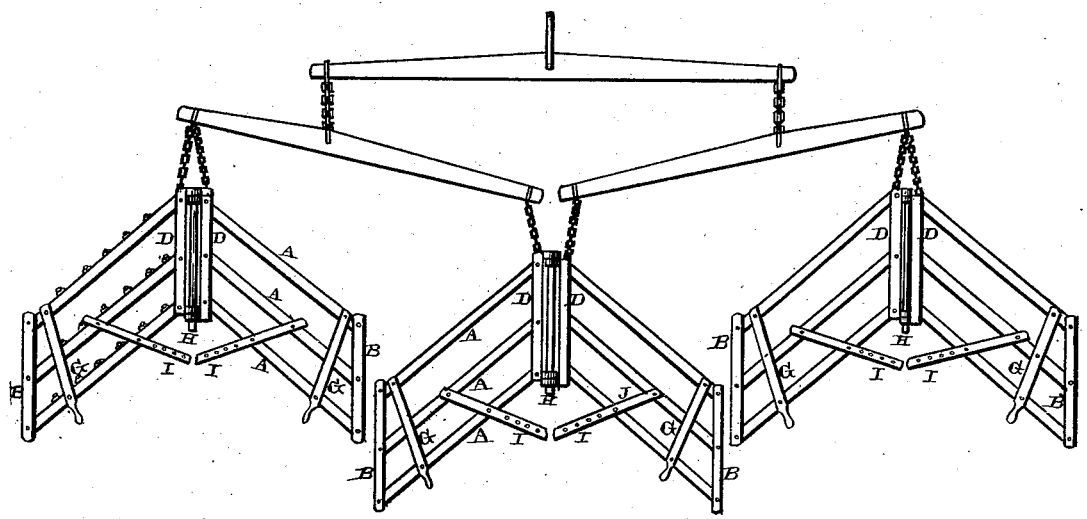
Figure 2:
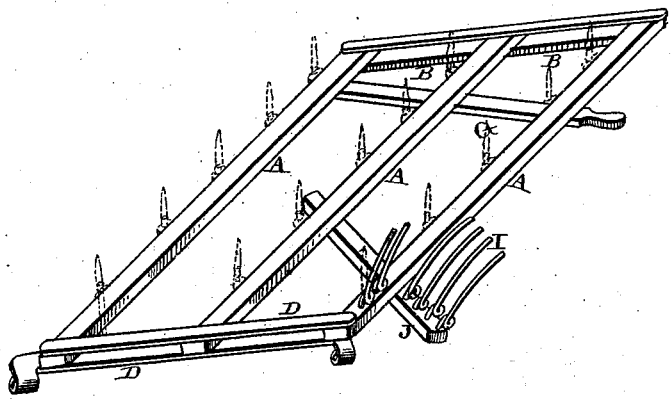

Figure 1 is a plan view of my invention, showing six sections of the harrow attached to the equalizing-bars. Fig. 2 is a perspective of one of the sections of the harrow, taken from its under side. Fig. 3 is a plan view of two of the sections of the harrow connected to a single draft-bar.

A represents the beam of the harrow, and which may be made of either wood or iron. Beams made of double-flanged iron are preferred. These beams are secured together at their outer ends by the bar or brace B, and connected together at their inner ends by means of the two iron or wooden plates D, the upper one of which has the hinges F fastened or formed upon it. The ends of the beams are pivoted between these plates, so that the beams can swing straight backward, and thus entirely reverse the harrow and adapt it to be drawn from the opposite end and in the opposite direction. These bars A can be adjusted at any angle to the two plates for the purpose of increasing or decreasing the width of the harrow, and after they have once been adjusted into proper position they are securely held by the cross bar or brace G. When it is desired to reverse the harrow this cross-bar G must first be removed. Each one of the parts of the harrow is provided with teeth which are inclined at any desired angle, so that when the harrow is drawn in one direction the teeth are used in an inclined position, and when the harrow is reversed and drawn in the opposite direction the teeth will stand in a vertical position. By thus making the harrow reversible either slanting or vertical teeth may be used, as the operator may desire.

Two of the parts or sections of the harrow are united together by a pivoted rod or bolt, H, which passes through the hinges fastened or formed upon the upper plate, thus allowing either one of the parts to be freely raised by means of the handle, which is formed upon the rear end of the brace H, for the purpose of freeing the teeth from rubbish or obstructions of any kind. By catching hold of both handles at once the operator can raise both parts from the ground at its rear end for the purpose of allowing the teeth to free themselves.

Each one of the parts or sections of the harrow is provided with the usual rigid teeth, which are intended to run only between the rows of corn, and with a series of light spring-teeth, I, which are to run directly upon the growing grain for the purpose of pulverizing the earth all around it. These spring-teeth are secured to removable bars J, which are removably secured to or across the beams A at any desired angle, so that in case it should be desired to use the rigid teeth in a vertical position and have the harrow drawn from the end at which the spring-teeth are attached the spring-teeth can be removed. These elastic teeth run directly upon the rows of growing plants and very thoroughly break up and pulverize the earth all around them without injuring them in the least. By the use of these teeth the crop can be much more thoroughly cultivated than where the teeth simply run upon both sides of the plant and break up the ground at a distance, in contradistinction to that which is in immediate contact with them. If so desired, a portion of these spring-teeth may be attached to the inner ends of the beams A, but in which case they must be made automatic, and reverse when the harrow is drawn from the other end.

In order to harrow three rows of corn at once I take six of these sections of harrows and connect them together in three pairs, as shown in Fig. 1, and thus form three V-shaped harrows. Each one of these pairs of sections is shown as being connected preferably with the draft-equalizer patented by me on the 18th of January, 1881, so that each pair will have a free vibratory motion back and forth, and thus always run straight and central, instead of being forced backward out of line whenever an obstruction is encountered, which is the case with all harrow-sections which are hitched to one corner and drawn diagonally. By this arrangement of parts the central pair of sections are equally balanced by the two outer pair of sections, and are as free to play back and forth as either one of the outer pair of sections, which is not the case where all three of the pairs are connected to a single continuous rod. By this arrangement and combination of parts the spring-teeth will always run directly upon the row of growing corn, while the rigid teeth will run only between the rows, and are not permitted to come in contact with the young and tender plants.

Where it is desired to use but two sections of the harrow in connection with a single draft-bar, as shown in Fig. 3, there will be two sets of spring-teeth used, the outer set of teeth being connected to rods or bars L, which are secured to the sides of the central beams, A, and which rods project beyond the outer ends of the beams, as shown. Through these outer projecting ends of the rods the spring-teeth are passed, and these teeth run upon the two outer rows of corn, while the central set of teeth run upon the central row.

Having thus described my invention, I claim—

1. The combination of an equalizing-draft attachment, substantially as set forth, with six sections of harrow-frames, the harrow being connected together in pairs, substantially as shown.

2. In a harrow, the combination of a set of rigid teeth which are adapted to run between the rows, and a set of elastic spring-teeth which are intended to run directly upon the growing plants, substantially as set forth.

3. In a harrow, the combination of the harrow-frame carrying rigid teeth, with one or more bars placed at any suitable angle thereto, and provided with a series of elastic spring-teeth, substantially as specified.

In testimony whereof I affix my signature in presence of two witnesses.

JAMES H. BARLEY.

Witnesses:
  A. P. MOREY,
  P. G. STAFFORD.